US000001138H

United States Statutory Invention Registration [19]

[11] Reg. Number: H1138

Bloom et al.

[43] Published: Feb. 2, 1993

[54] PROCESSING METHOD FOR SUPERCONDUCTING CERAMICS

[75] Inventors: Ira D. Bloom, Bolingbrook; Roger B. Poeppel, Glen Ellyn, both of Ill.; Brian K. Flandermeyer, Cincinnati, Ohio

[73] Assignee: The United States of America as represented by the United States Department of Energy, Washington, D.C.

[21] Appl. No.: 519,981

[22] Filed: May 7, 1990

[51] Int. Cl.[5] ..... H01B 12/00

[52] U.S. Cl. ..... 505/1; 505/739

[58] Field of Search ..... 505/1, 739

[56] References Cited

U.S. PATENT DOCUMENTS

| | | | |
|---|---|---|---|
| 3,640,764 | 2/1972 | Shelvin | 501/20 |
| 3,975,201 | 8/1976 | Greenstein | 501/20 |
| 4,724,021 | 2/1988 | Martin et al. | 501/138 |
| 4,978,515 | 12/1990 | Johnson | 501/95 |

FOREIGN PATENT DOCUMENTS

| | | | |
|---|---|---|---|
| 050352 | 1/1989 | Japan | 505/739 |
| 064017 | 1/1989 | Japan | 505/739 |
| 01156458 | 6/1989 | Japan . | |

OTHER PUBLICATIONS

Reed, *Introduction to the Principles of Ceramic Processing*, 1988, p. 13, 255–260.

Yen et al, "High Tc Superconducting y-Ba-Cu-O Thick Film by Screen Printing" Mat. Res. Soc. Syn. Proc., vol. 99, 1988 (Symposium: Nov. 30–Dec. 4, 1987), pp. 711–713.

Chan et al, "Superconducting Paste", Mat. Res. Soc. Sym. Proc., (Symposium Date: Apr. 4–9, 1988) pp. 105–108.

Ishii et al, "Fabrication of Superconducting $YBa_2Cu_3O_{7-\delta}$ Films by Tape Casting Method", Jap Jour. App. Phy. vol. 26, Nov. 1987, pp. L1959–L1960.

*Primary Examiner*—Donald P. Walsh
*Assistant Examiner*—Ngoclan T. Mai
*Attorney, Agent, or Firm*—James W. Weinberger; Thomas G. Anderson; William R. Moser

[57] ABSTRACT

A process for preparing a superconducting ceramic and particularly $YBa_2Cu_3O_{7-\delta}$, where $\delta$ is in the order of about 0.1–0.4, is carried out using a polymeric binder which decomposes below its ignition point to reduce carbon residue between the grains of the sintered ceramic and a nonhydroxylic organic solvent to limit the problems with water or certain alcohols on the ceramic composition.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESSING METHOD FOR SUPERCONDUCTING CERAMICS

CONTRACTUAL ORIGIN OF THE INVENTION

The U.S. Government has rights in this invention pursuant to Contract No. W-31-109-ENG-38 between the U.S. Department of Energy and The University of Chicago representing Argonne National Laboratory.

BACKGROUND OF THE INVENTION

This invention relates to the preparation of metal oxide superconducting ceramics and more particularly to the use of new processing additives for preparing the sintered superconductors. Since the discovery of metal oxide superconducting ceramics, considerable effort has been directed to the development of compositions with high Tc and improved performance with emphasis being placed on processing techniques. In these ceramic compositions, it has been important that the grain contact areas have minimal contamination with nonsuperconducting phases or other materials which would adversely affect the passage of current.

One of the important metal-oxide superconductors has the composition $YBa_2Cu_3O_{7-\delta}$ where $\delta$ may vary from about 0.1–0.4 with the composition being commonly identified as "123". Preparation of the composition involves the mixing of $Y_2O_3$, CuO and $BaCO_3$, calcining of the mixture to form $YBa_2Cu_3O_{7-\delta}$, grinding to reduce particle size, forming into a "green" body and sintering to form the final product. Usually, a solvent and binder are included as processing additives after calcining. The solvent is usually selected to have the property of being volatilized at temperatures below about 100° C. with the binder remaining until an ignition temperature of about 500° C. is reached with the sintering subsequently being carried out at about 850°–975° C. An illustration of a common solvent-binder combination is methanol and polyvinyl alcohol.

Since the binder is removed by burning, some residue is formed on the grains. While the extent of the problem has not been measured, the formation of residue between the grains will increase the resistance between grains and limit the current density of the superconductor.

Another problem which may occur in the processing is the potential for an adverse effect of any moisture or alcohol on the composition or components. In the preparation of the superconducting ceramic, it is of considerable importance to maximize the percentage of the desired superconductor and avoid or limit the levels of materials which are not superconducting.

Accordingly, one object of this invention is the preparation of a superconducting composition with limited residue formed between interconnecting grains of the superconductor. Another object of the invention is the preparation of a superconducting composition in which the presence of water or other hydroxy-containing compound is minimized. These and other objects of the invention will become apparent from the following description.

SUMMARY OF THE INVENTION

Briefly, this invention involves the preparation of a metal-oxide superconducting composition using a binder which decomposes below its ignition temperature with the resulting decomposition products being volatilized. The binders of particular interest are polymeric binders which depolymerize below about 500° C. and preferably between 300°–450° C. with the resulting products being volatilized. A preferable binder is polyisobutylene. Advantageously, the invention also includes the use of a solvent essentially free of water or alcohol. Preferably, the solvent is an ether such as tetrahydrofuran, or a hydrocarbon such as cyclohexane or the like. In the inventive method of preparation, the components are mixed, heated to an elevated temperature for calcining, processed in a grinding operation to reduce particle size, and heated to a second elevated temperature for sintering, with a nonhydroxy containing solvent and a polymeric binder being added at a stage after the calcining.

DETAILED DESCRIPTION OF THE PREFERRED EMBODIMENT

The invention is useful in the preparation of metal oxide superconducting ceramics based on the presence of one or more —Cu—O— planes and/or chains including those with the general formula $(La_{1-x}A_x)\ CuO_4$ where A may be Ca, Sr or Ba and x is in the order of 0.1–0.2; $RBa_2Cu_3O_{7-\delta}$ where R is a rare earth; $Bi_2Ca_2Sr_2Cu_3O_{10}$, $Bi_2Ba_2CaCu_2O_8$, and those where Tl may be substituted for Bi and Sr may be substituted for Ba. The preferred superconductor is $YBa_2Cu_3O_{7-\delta}$.

In general, these are prepared from reactive mixtures of oxides, nitrates and/or carbonates of the metals with each reactant being added in an appropriate ratio for the desired superconducting material. Suitable reactants include $Y_2O_3$, $BaCO_3$, $CaCO_3$, $SrCO_3$, $Bi_2O_3$ and $Tl_2O_3$ and the corresponding oxides and carbonates of the other metals. Advantageously, the reactants are milled in a vibratory mill with liquid hydrocarbon such as toluene and zirconia or other milling media at ambient temperatures for about 2–3 h.

The mixture of reactants is then calcined at suitable temperatures to form the superconducting composition or similar composition which may be subsequently converted to a superconducting composition by treatment in an oxygen atmosphere. Temperatures in the order of 700°–750° C. for about 6–10 h are representative.

Particularly when current density is of importance, the composition from calcining is processed further in a grinding operation to reduce particle size. Advantageously, the resulting particle size is in the order of about 5–10 microns.

Following the grinding operation, the composition is formed by pressing, extrusion or the like into a desired form and sintered. Advantageously, the sintering is at temperatures in the order of about 850°–975° C. to form an integral mass of interconnected particles or grains.

The inventive method further includes the use of a solvent and binder added to the composition following the calcining and preferably before the grinding or pressing operations. The solvent permits the extension of the binder throughout the particle mixture.

During the sintering step in the process, the solvent is removed by evaporation at temperatures of about 60°–80° C. and preferably below about 100° C. Suitable solvents are the nonhydroxylic organics including ethers with less than about eight carbon atoms such as tetrahydrofuran, hydrocarbons with about 6–8 carbon atoms such as cyclohexane, and the like. The binder remains in the composition after removal of the solvent until a decomposition temperature of the order of about 400° C. is reached. The binder is an organic selected to form decomposition and preferably depolymerized products which volatilize off at temperatures in the order of about 300°–450° C. Advantageously, the binder is polymeric including polyisobutylene, polyisoprene and the like. Preferably, the binder is a polymer or copolymer of butene-1. These in general will have molecular weights in the order of about 3,000–500,000 and preferably about 50,000–500.000.

The following examples are provided for illustrative purposes and are not intended to be restrictive as to the scope of the invention.

EXAMPLE I

A metal-oxide superconductor with the general formula $YBa_2Cu_3O_{7-\delta}$ was prepared. In the process, a mixture of about 5.0 gm $Y_2O_3$, 17.37 gm $BaCO_3$ and 10.50 gm CuO was milled in about 50 ml toluene for about 2 hr. The toluene was removed by drying overnight. The resulting mixture was then heated overnight under oxygen at a rate of about 3.3° C./min to a temperature of about 686° C. After cooling, the product was composed of particles of a black solid composition. A mixture of polyisobutylene (mol. wt. of about 380,000) in tetrahydrofuran (about 1 gm or 0.5–1 wt. %) was added to the composition and the particles were pressed at about 10,000 psi into a pellet of about ¼ inch in diameter. The pellet was heated to a temperature of about 790° C. and sintered overnight under flowing oxygen. A Meissner effect was demonstrated on the product.

EXAMPLE II

Following the sintering of the composition of Example I, the sintered product is examined by a scanning electron microscope for evidence of organic residue from the binder. The product appears to be essentially free of carbon-based residue.

The foregoing description of embodiments of the invention has been presented for purposes of illustration and description. It is not intended to be exhaustive or to limit the invention to the precise form disclosed. Other modifications and variations are possible in light of the above teaching.

The embodiments of the invention in which an exclusive property or privilege is claimed are defined as follows:

1. A method of preparing a sintered, metal-oxide superconducting ceramic of the formula $YBa_2Cu_3O_{7-\delta}$ where $\delta$ is in the range of about 0.1–0.4, the method comprising the steps of calcining a mixture of reactants at a temperature sufficient to produce the unsintered ceramic, distributing a polymeric binder of polyisobutylene or polyisoprene and solvent throughout the unsintered ceramic, the binder being decomposable without forming a residue at temperatures below its ignition point, the solvent being a nonhydroxylic or organic solvent with a volatilization temperature below about 100° C., grinding the unsintered composition including binder to reduce the particle size to about 5–10 microns, and heating the binder and unsintered ceramic to a sintering temperature above the ignition temperature, the heating being carried out under conditions to allow decomposition of the binder and removal of the decomposition products by volatilization prior to the sintering.

2. The method of claim 1 wherein the binder is polyisobutylene.

3. The method of claim 1 wherein the solvent is tetrahydrofuran.

4. The method of claim 1 wherein the solvent is cyclohexane.

* * * * *